(12) United States Patent
Benoit et al.

(10) Patent No.: US 9,357,385 B2
(45) Date of Patent: May 31, 2016

(54) CONFIGURATION OF A NEW ENROLLEE DEVICE FOR USE IN A COMMUNICATION NETWORK

(71) Applicant: QUALCOMM Incorporated, San Diego, CA (US)

(72) Inventors: Olivier Jean Benoit, San Diego, CA (US); Peerapol Tinnakornsrisuphap, San Diego, CA (US); Etan Gur Cohen, San Francisco, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/659,689

(22) Filed: Oct. 24, 2012

(65) Prior Publication Data

US 2014/0053281 A1 Feb. 20, 2014

Related U.S. Application Data

(60) Provisional application No. 61/691,235, filed on Aug. 20, 2012.

(51) Int. Cl.
*H04W 12/06* (2009.01)
*H04L 12/28* (2006.01)
(Continued)

(52) U.S. Cl.
CPC .......... *H04W 12/06* (2013.01); *H04L 12/2809* (2013.01); *H04L 41/0809* (2013.01);
(Continued)

(58) Field of Classification Search
CPC ..... H04L 63/08; H04L 9/088; H04L 63/0492; H04L 63/18; H04L 63/0815; H04L 63/083; H04L 21/31; H04L 21/41; H04L 63/10; H04L 63/102; H04L 41/28; H04L 29/06551; H04L 29/06755; H04L 29/06768; H04L 29/06823; H04L 29/06782; G06F 15/16; G06F 21/00; G06F 17/00; H04W 12/06; H04W 84/18
USPC .......................................................... 726/29
See application file for complete search history.

(56) References Cited

U.S. PATENT DOCUMENTS

| 7,043,230 B1 | 5/2006 | Geddes et al. |
| 7,319,853 B2 | 1/2008 | Luebke et al. |

(Continued)

FOREIGN PATENT DOCUMENTS

| EP | 2096505 A1 | 9/2009 |
| WO | 2010028681 | 3/2010 |

(Continued)

OTHER PUBLICATIONS

Co-pending U.S. Appl. No. 61/691,235, filed Aug. 20, 2012.

(Continued)

*Primary Examiner* — Eleni Shiferaw
*Assistant Examiner* — Nelson Giddins
(74) *Attorney, Agent, or Firm* — DeLizio Law, PLLC

(57) ABSTRACT

An electronic device obtains a device password associated with the new enrollee device to be configured for a communication network. The device password is provided to a network registrar to cause the network registrar to configure the new enrollee device for the communication network. The network registrar performs an enrollment process based upon the device password and provides feedback to the electronic device to indicate whether or not the new enrollee device was successfully added to the communication network. Alternatively, when an electronic device detects the presence of a new enrollee device to be configured for the communication network, the electronic device generates a device password for the new enrollee device and provides the device password to the new enrollee device and to the network registrar, thereby causing the network registrar to initiate an enrollment process for the new enrollee device based upon the device password.

31 Claims, 9 Drawing Sheets

(51) Int. Cl.
*H04L 12/24* (2006.01)
*H04L 29/06* (2006.01)
*H04W 84/18* (2009.01)

(52) U.S. Cl.
CPC ......... *H04W84/18* (2013.01); *H04L 29/06551* (2013.01); *H04L 29/06782* (2013.01); *H04L 41/28* (2013.01); *H04L 63/08* (2013.01); *H04L 63/083* (2013.01); *H04L 63/10* (2013.01)

(56) References Cited

U.S. PATENT DOCUMENTS

| | | | |
|---|---|---|---|
| 7,499,548 B2 | 3/2009 | Meandzija et al. | |
| 7,616,594 B2* | 11/2009 | Roberts et al. | 370/310 |
| 7,908,643 B2 | 3/2011 | Huotari et al. | |
| 8,001,584 B2* | 8/2011 | Lortz et al. | 726/5 |
| 8,224,246 B2 | 7/2012 | Suumaki et al. | |
| 8,234,492 B2 | 7/2012 | Kim et al. | |
| 2003/0126243 A1* | 7/2003 | Kudo et al. | 709/222 |
| 2004/0098581 A1 | 5/2004 | Balfanz et al. | |
| 2005/0010680 A1* | 1/2005 | Zick et al. | 709/237 |
| 2005/0159823 A1 | 7/2005 | Hayes et al. | |
| 2006/0015937 A1* | 1/2006 | Illowsky et al. | 726/18 |
| 2006/0053276 A1* | 3/2006 | Lortz et al. | 713/2 |
| 2006/0062391 A1* | 3/2006 | Lee et al. | 380/270 |
| 2006/0236105 A1 | 10/2006 | Brok et al. | |
| 2006/0239208 A1* | 10/2006 | Roberts et al. | 370/254 |
| 2007/0079362 A1* | 4/2007 | Lortz et al. | 726/5 |
| 2007/0101136 A1* | 5/2007 | Lai et al. | 713/168 |
| 2007/0113269 A1 | 5/2007 | Zhang | |
| 2007/0287450 A1* | 12/2007 | Yang et al. | 455/433 |
| 2008/0037444 A1* | 2/2008 | Chhabra | 370/254 |
| 2008/0189398 A1* | 8/2008 | Solyanik | 709/221 |
| 2008/0203148 A1* | 8/2008 | Young | 235/375 |
| 2008/0271131 A1* | 10/2008 | Moore | 726/9 |
| 2009/0224906 A1* | 9/2009 | Balgard et al. | 340/539.1 |
| 2009/0300746 A1 | 12/2009 | Ahn | |
| 2010/0260069 A1* | 10/2010 | Sakamoto et al. | 370/254 |
| 2011/0044208 A1* | 2/2011 | Yun et al. | 370/254 |
| 2011/0090896 A1* | 4/2011 | Bradley | 370/350 |
| 2011/0191842 A1 | 8/2011 | Lindholm et al. | |
| 2011/0197267 A1 | 8/2011 | Gravel et al. | |
| 2011/0219427 A1* | 9/2011 | Hito et al. | 726/3 |
| 2011/0271334 A1* | 11/2011 | Yang et al. | 726/7 |
| 2011/0275316 A1* | 11/2011 | Suumaki et al. | 455/41.1 |
| 2011/0277020 A1* | 11/2011 | Morita et al. | 726/5 |
| 2012/0079123 A1* | 3/2012 | Brown et al. | 709/228 |
| 2012/0099566 A1* | 4/2012 | Laine et al. | 370/338 |
| 2012/0100803 A1* | 4/2012 | Suumaki et al. | 455/41.1 |
| 2012/0128157 A1 | 5/2012 | Braun | |
| 2012/0148043 A1* | 6/2012 | Tofighbakhsh | 380/247 |
| 2012/0167175 A1 | 6/2012 | Choi | |
| 2012/0252405 A1* | 10/2012 | Lortz et al. | 455/410 |
| 2012/0270505 A1* | 10/2012 | Prakash et al. | 455/66.1 |
| 2012/0284785 A1 | 11/2012 | Salkintzis et al. | |
| 2012/0311165 A1* | 12/2012 | Renschler et al. | 709/228 |
| 2012/0324553 A1* | 12/2012 | Garcia Bernardo et al. | 726/6 |
| 2012/0329429 A1 | 12/2012 | Jabara et al. | |
| 2013/0029597 A1* | 1/2013 | Liu et al. | 455/41.1 |
| 2013/0052946 A1* | 2/2013 | Chatterjee et al. | 455/41.1 |
| 2013/0058274 A1* | 3/2013 | Scherzer et al. | 370/328 |
| 2013/0068837 A1* | 3/2013 | Dollard | 235/380 |
| 2013/0104202 A1* | 4/2013 | Yin et al. | 726/5 |
| 2013/0111208 A1* | 5/2013 | Sabin et al. | 713/171 |
| 2013/0139233 A1* | 5/2013 | Maity | 726/7 |
| 2013/0173915 A1* | 7/2013 | Haulund | 713/159 |
| 2013/0185210 A1* | 7/2013 | Dodson et al. | 705/44 |
| 2013/0196647 A1 | 8/2013 | Raleigh et al. | |
| 2013/0198816 A1* | 8/2013 | Bohli et al. | 726/4 |
| 2013/0221083 A1* | 8/2013 | Doss et al. | 235/375 |
| 2013/0221084 A1* | 8/2013 | Doss et al. | 235/375 |
| 2013/0223279 A1* | 8/2013 | Tinnakornsrisuphap et al. | 370/254 |
| 2013/0239104 A1* | 9/2013 | Savant et al. | 717/178 |
| 2013/0262687 A1* | 10/2013 | Avery et al. | 709/229 |
| 2013/0262873 A1* | 10/2013 | Read et al. | 713/186 |
| 2013/0276079 A1 | 10/2013 | Foulds et al. | |
| 2013/0305329 A1* | 11/2013 | Zhang | 726/6 |
| 2013/0309971 A1* | 11/2013 | Kiukkonen et al. | 455/41.2 |
| 2013/0318343 A1* | 11/2013 | Bjarnason et al. | 713/157 |
| 2014/0007200 A1 | 1/2014 | Zisimopoulos et al. | |
| 2014/0028817 A1* | 1/2014 | Brockway et al. | 348/61 |
| 2014/0028818 A1* | 1/2014 | Brockway et al. | 348/61 |
| 2014/0068719 A1* | 3/2014 | Kiukkonen et al. | 726/4 |
| 2014/0169567 A1* | 6/2014 | Wendling | 380/279 |
| 2014/0226819 A1* | 8/2014 | Dittrich | 380/270 |
| 2014/0245410 A1 | 8/2014 | Frelechoux | |
| 2014/0281478 A1* | 9/2014 | Huang et al. | 713/150 |
| 2014/0282960 A1* | 9/2014 | Tinnakornsrisuphap et al. | 726/7 |
| 2015/0089216 A1 | 3/2015 | Benoit et al. | |

FOREIGN PATENT DOCUMENTS

| | | |
|---|---|---|
| WO | 2013126731 | 8/2013 |
| WO | 2014031542 | 2/2014 |
| WO | 2014151892 | 9/2014 |

OTHER PUBLICATIONS

PCT Application No. PCT/US2013/055600, International Search Report and Written Opinion, 11 pages, Dec. 20, 2013.
"Wi-Fi Protected Setup Specification Version 1.0h", XP055031152, Internet Retrieved from the Internet: URL: http://gpl.back2roots.org/source/puma5/netgear/CG3200-1TDNDS_GPL/ap/apps/wpa2/original/Wi-Fi Protected Setup Specification 1.0h.pdf [retrieved on Jun. 26, 2012] Section 4 and subsections, pp. 1-110, Dec. 31, 2006.
Zhang, Ning, "Wi-Fi Direct based Smart Set-up (WDSS) in Lighting Systems" , M.Sc. Thesis Delft University of Technology, XP055092589, , 76 pages, May 15, 2012.
"PCT Application No. PCT/US2013/055600 Written Opinion of the IPEA", Aug. 25, 2014, 6 pages.
"PCT Application No. PCT/US2014/026625 International Search Report and Written Opinion", Jun. 26, 2014, 9 pages.
"PCT Application No. PCT/US2014/026625 Written Opinion", Feb. 19, 2015, 5 pages.
"U.S. Appl. No. 13/837,703 Final Office Action", Jul. 6, 2015, 35 pages.
"U.S. Appl. No. 13/837,703 Final Office Action", Nov. 7, 2014, 36 pages.
"U.S. Appl. No. 13/837,703 Office Action", Feb. 6, 2015, 30 pages.
"U.S. Appl. No. 13/837,703 Office Action", Jul. 15, 2014, 35 Pages.
"Wi-Fi Certified™ for Wi-Fi Protected Setup: Easing the User Experience for Home and Small Office Wi-Fi® Networks", Internet Citation, 2007, pp. 1-16, XP002567243, Retrieved from the Internet: URL:http://www.wi-fi.org/wp/wifi-protected-setup., 2007, 16 pages.
Co-Pending U.S. Appl. No. 14/616,551, filed Feb. 6, 2015, 72 pages.
"U.S. Appl. No. 13/837,703 Office Action", Jan. 20, 2016, 29 pages.

* cited by examiner

CONFIGURATION OF A NEW ENROLLEE DEVICE FOR USE IN A COMMUNICATION NETWORK

CROSS-REFERENCE TO RELATED APPLICATIONS

This application claims the priority benefit of U.S. Provisional Application Ser. No. 61/691,235 filed Aug. 20, 2012.

BACKGROUND

This disclosure generally relates to the field of communication systems and, more particularly, to configuration of a new enrollee device in a home communication network.

Home communication networks may comprise one or more networking technologies (e.g., various combinations that may include wireless local area network (WLAN) technologies, powerline communication (PLC) technologies, multimedia over coaxial (MoCA), IEEE 1901, Ethernet, etc.). A home communication network may also be referred to as a hybrid communication network, home environment network, mixed communication network, or simply a "home network." Typically, the communication mechanisms and protocol specifics (e.g., device and topology discovery protocols, bridging protocols, etc.) are unique to each networking technology.

Some devices that are expected to be used in the home network may be considered a "headless" device. Headless devices are devices which do not have a graphical user interface. Furthermore, headless devices may use one or more networking technology associated with a home network. Examples of headless devices might include sensors, light bulbs, cameras, actuators, appliances, game controllers, audio equipment or other devices that may be capable of communicating via the home network but which may not have a graphical user interface due to commercial or technical limitations. In addition to headless devices, some devices are hard to reach (e.g. light bulb, motion sensors, etc., such as devices that may be utilized on a ceiling). These devices may be considered "unreachable" devices due to their physical placement.

A new device introduced to a home network is referred to as a new enrollee device because it must be configured (e.g. via an enrollment process) with various network configurations and settings. However, initial network configuration of a headless or unreachable device is currently difficult due to the lack of a graphical user interface. In order to configure headless or unreachable devices, configuration of such a device may require an out of band channel. An administrator of home network devices may be non-technical or have difficulty with current process used to configure a headless or unreachable device to operate in the home network.

SUMMARY

Disclosed are various embodiments of configuring a new enrollee device for a communication network. In one embodiment, an electronic device obtains a device password associated with the new enrollee device. The device password is provided to a network registrar to cause the network registrar to configure the new enrollee device for the communication network. The network registrar performs an enrollment process based upon the device password and, optionally, provides feedback to the electronic device to indicate whether or not the new enrollee device was successfully enrolled (i.e. added) to the communication network. In another embodiment, an electronic device detects the presence of a new enrollee device to be configured for the communication network. The electronic device generates a device password for the new enrollee device and provides the device password to the new enrollee device and to the network registrar, thereby causing the network registrar to initiate an enrollment process for the new enrollee device based upon the device password.

BRIEF DESCRIPTION OF THE DRAWINGS

The present embodiments may be better understood, and numerous objects, features, and advantages made apparent to those skilled in the art by referencing the accompanying drawings, in which like reference numerals refer to substantially similar items throughout.

DESCRIPTION OF EMBODIMENT(S)

Figure 1:
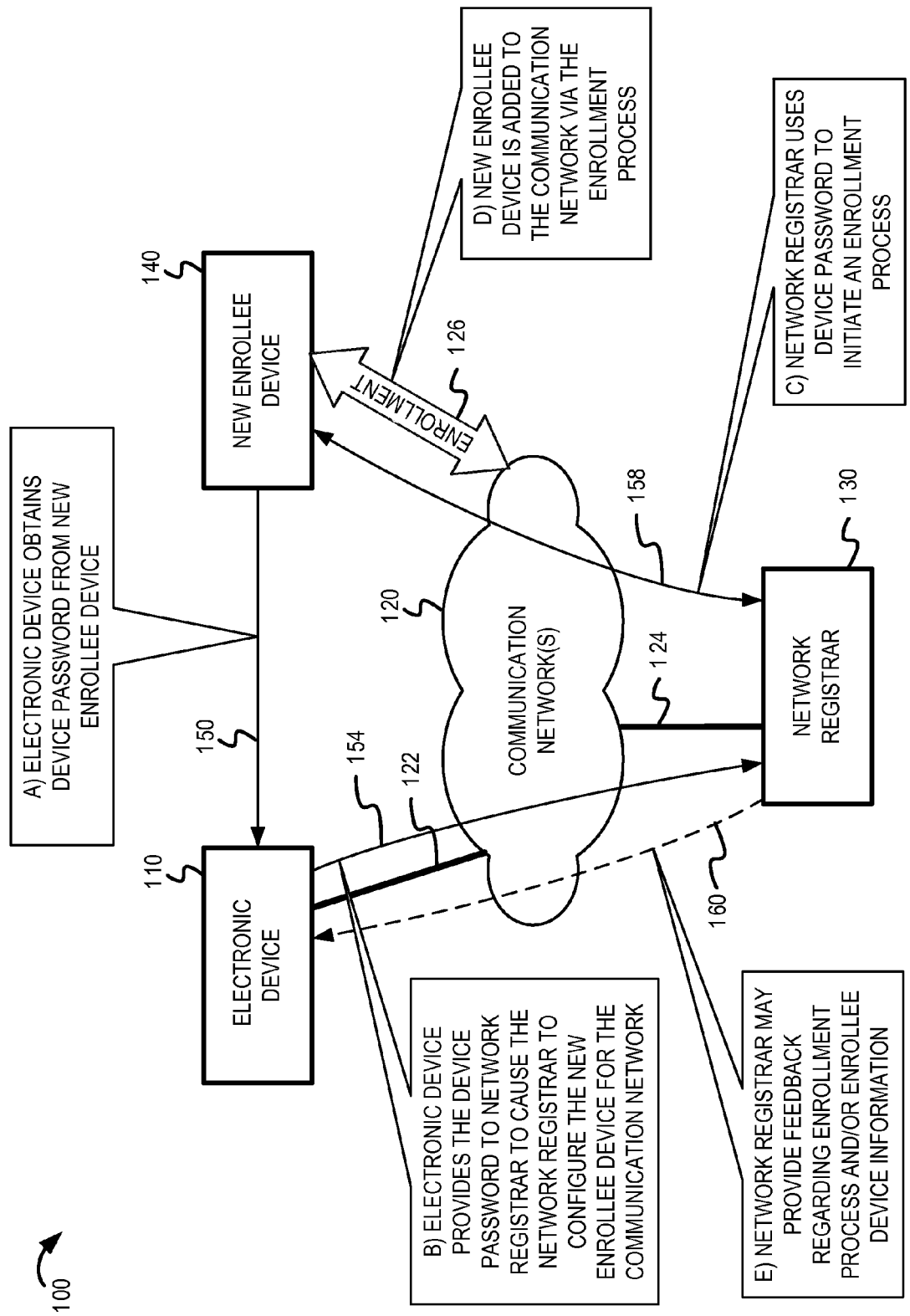
FIG. 1 is an example block diagram illustrating one embodiment of configuring a new enrollee device for a communication network in which an electronic device obtains a device password from the new enrollee device in accordance with this disclosure.

The description that follows includes exemplary systems, methods, techniques, instruction sequences, and computer program products that embody techniques of the present inventive subject matter. However, it is understood that the described embodiments may be practiced without these specific details. For instance, although examples refer to configuration of a particular headless device, such as a light bulb, for a home communication network comprising wireless local area network (WLAN) devices (e.g., IEEE 802.11), power line network devices (e.g., Homeplug AV), coax network devices (MoCA), and Ethernet devices, the present disclosure relates to a variety of new enrollee devices that may be configured for use in a communication network comprising other networking technologies. In other instances, well-known instruction instances, protocols, structures, and techniques have not been shown in detail in order not to obfuscate the description.

New enrollee devices (e.g., smart lighting systems, smart thermostats, etc.) are typically configured for use with a home communication network (e.g., a home WLAN, a powerline network, etc.) before the new enrollee devices and their corresponding services can be utilized. For example, some networking protocols (e.g., Bonjour, universal plug and play (UPnP), etc.) may typically require the new enrollee device to be connected to the local network (e.g., the home WLAN). A network name, password, configuration settings, or other information, may be needed by the new enrollee device to properly utilize one or more networking technologies associated with the home network. However, the new enrollee device (such as a headless device) may have little to no user input capability. Configuring and controlling the new enrollee device via an Internet-based configuration page or via a panel of buttons/dials on the new enrollee device can be difficult. This can make the process of configuring the new enrollee device time consuming, complicated, expensive, and frustrating to users. Existing techniques for new enrollee device configuration typically employ a network password method, a static PIN method, or a push button method to initiate the Wi-Fi® Protected Setup (WPS) connection procedures and to connect the new enrollee device to an access point of the home network. However, the push-button may break, may be physically awkward, and implementing the push-button on the new enrollee devices can increase the cost and size of the new enrollee devices and may not be user-friendly. The push-button method may also not be feasible for unreachable devices due to their physical placement out of the reach of a user. Furthermore, communications exchanged after the push-button is activated may be susceptible to security and privacy issues (e.g., active eavesdroppers). The static PIN method may involve the user employing a computer or another communication device to input the PIN (e.g., because the access point and/or the new enrollee device may not have a user input panel). The user may also lose/forget the predetermined static PIN or may select an easily compromised PIN; thus the static PIN method may be neither easy to implement nor secure. The network password method may be unavailable for headless devices because there is no user interface available on the headless device for a user to enter the network password.

Figure 2:
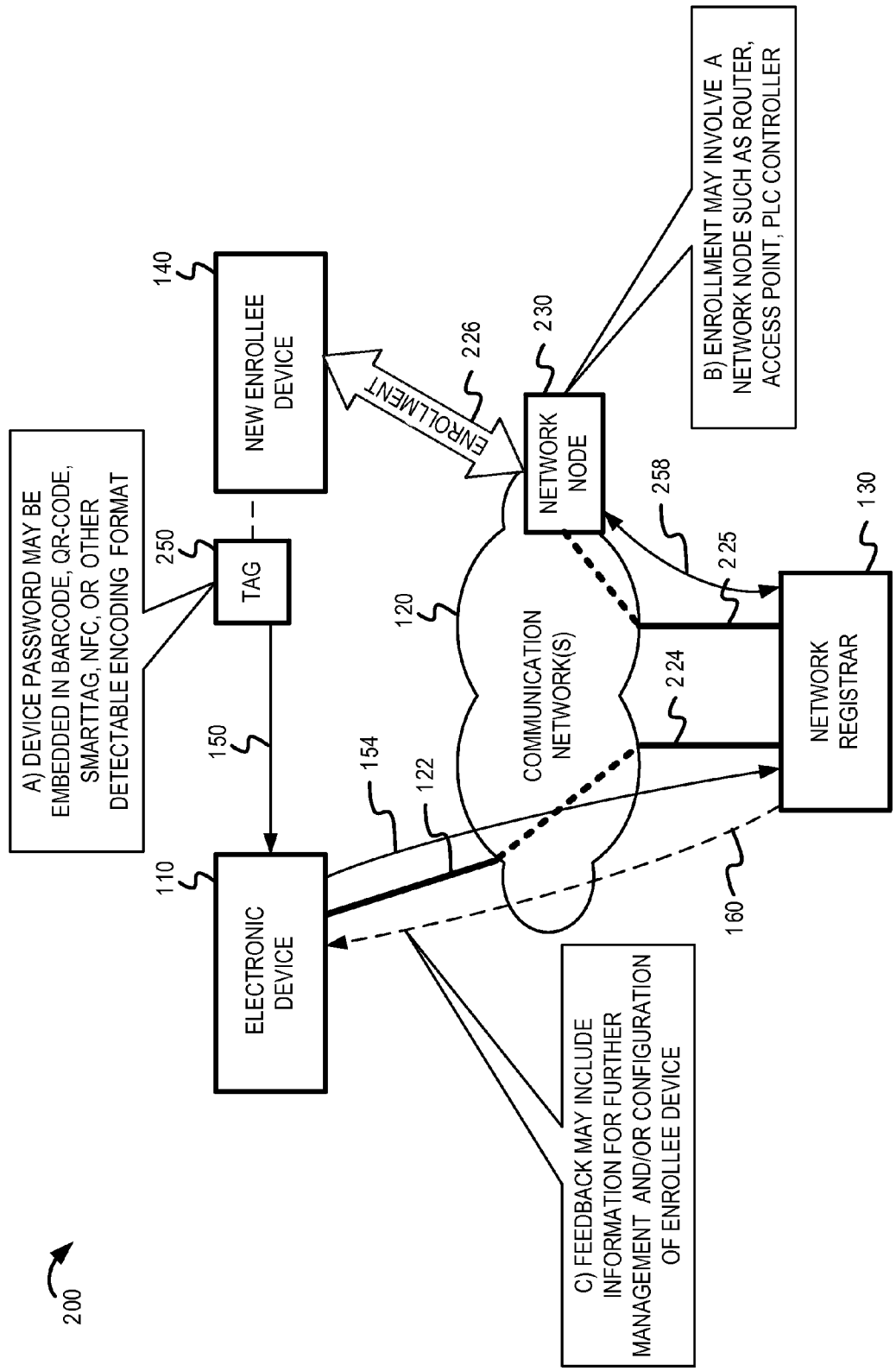
FIG. 2 is an example block diagram illustrating various alternative embodiments of configuring a new enrollee device for a communication network in accordance with this disclosure.
Figure 3:
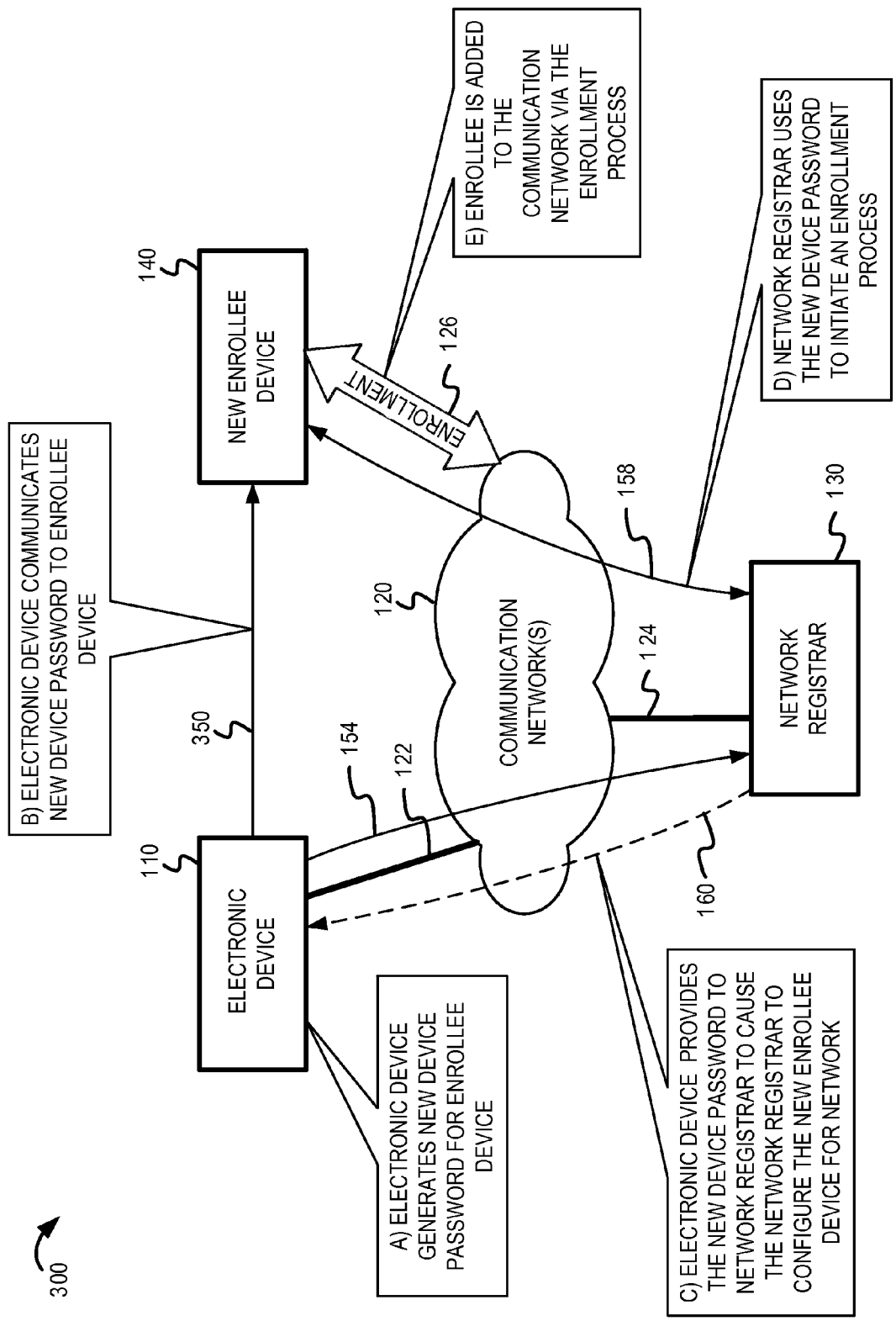
FIG. 3 is an example block diagram illustrating another alternative embodiment of configuring a new enrollee device for a communication network in which an electronic device generates and provides a device password in accordance with this disclosure.

The present disclosure describes various methods and mechanisms to configure a new enrollee device, such as a headless device or a difficult to reach device. The process for configuring the new enrollment device for a communication network may be called an enrollment process. As a result of the enrollment process, the new enrollee device is added to the communication network. According to embodiments of the present disclosure, an electronic device may be used as an intermediary device and coordinate the exchange of a device password (which may also referred to a PIN, device identifier, device key, etc.) associated with a new enrollee device to a network registrar to cause the network registrar to configure the new enrollee device for the home network. In some embodiments, an electronic device or another user-friendly electronic device (e.g., a tablet computer) can implement functionality for assisting the enrollee (e.g., the new enrollee device that is not currently part of network) by obtaining a device password from the new enrollee device and providing the device password to a network registrar, thereby causing the network registrar to add the enrollee to the home network with very little manual intervention from the user. FIGS. 1-3 will describe example operations to configure a new enrollee device (or other network device) in a home network via an electronic device.

FIG. 1 is an example block diagram 100 illustrating one embodiment of configuring a new enrollee device 140 (which may be referred to simply as the "enrollee" in this disclosure) for communication with a communication network 120 (e.g. a home network). In FIG. 1, an electronic device 110 (which may be a previously enrolled device) and a network registrar 130 are communicatively coupled (via links 122 and 124, respectively) to the communication network 120. The networking technology used for links 122 and 124 may be, for example a WLAN network and may include the use of an access point (which may be collocated with the network registrar in a combined hybrid communication device). As an example, new enrollee device 140 may be a smart light source (e.g., a smart light bulb), a smart refrigerator, a smart sound system, or another suitable new enrollee device.

The electronic device 110 may be a portable electronic device such as a smartphone, mobile device, a tablet computer, a laptop computer, or another suitable electronic device configured to execute functionality described herein. The electronic device 110 acts as an intermediary device between the new enrollee device 140 and the network registrar 130 by obtaining (shown as arrow 150) a device password from the new enrollee device 140 and providing (shown as arrow 154) the device password to the network registrar 130. The network registrar 130 may initiate (shown as arrow 158) an enrollment process 126 in response to receiving the device password for the new enrollee device 140. Upon successfully completing the enrollment process 126 (i.e. the new enrollee device 140 is configured for use in the communication network 120), the network registrar 130 may provide a network feedback indication (shown as arrow 160) back to the electronic device 110 to indicate that the enrollment process completed successfully.

Having disclosed the high level features of this embodiment, various details and aspects will now be described using an example implementation. The following descriptions of operations are non-limiting examples.

At stage A, the electronic device 110 may obtain the device password using a variety of methods, such as scanning a visual tag, detecting an audio signal, detecting a light signal, detecting the device password via a near-field communication (NFC) tag, radio frequency identifier (RFID), or other ways in which the new enrollee device 140 may communicate the device password with the electronic device 110. It is noted that while Bluetooth radio signal or Wi-Fi Direct handshake may also be used by the electronic device to obtain the device password from the new enrollee device 140, such mechanisms may not be used in some implementations if they are prone to wireless signal eavesdropping. In a first example, the electronic device 110 is a personal mobile device and the new enrollee device 140 is a smart light bulb. The smart light bulb has a visual tag printed on it (or on the packaging, or insert in the packaging), such as a barcode, matrix code, two-dimensional code. A common example of a barcode that may be used for a new enrollee device may be a Quick Response (QR) Code®. The electronic device 110 may detect the QR Code (or similar visual tag) using a camera and corresponding software. The electronic device 110 may obtain the device password by decoding the QR Code. The device password may be a manufacturer-configured PIN or device key for the new enrollee device 140. For example, the device password may be a device access key (DAK) used for powerline communications, or may be a Wi-Fi® Simple Config (WSC) PIN.

In addition to the device password, other information may also be encoded on the QR Code, such as a management URL, name and/or model of the new enrollee device, or other information relevant to the configuration, management, or utilization of the new enrollee device.

At stage B, once the electronic device 110 has obtained the device password for the new enrollee device 140, the electronic device 110 communicates the device password to the network registrar 130 (which may also be referred to as a server or network registrar device) to cause the network registrar 130 to configure the new enrollee device 140 for the communication network 120. The network registrar 130 may be configured to manage devices in the communication network 120. For example, the network registrar 130 may be a hybrid network device with multiple home networking technologies. In the example of the smart light bulb, the smart light bulb may require a connection via a powerline communication network technology of the hybrid home network. The electronic device 110 may utilize a WLAN network to communicate the device password (e.g. PLC DAK) to the network registrar 130 which is capable of using the device password on the powerline communication network of the home network. In some embodiments, the electronic device 110 is already part of the communication network 120 and can therefore provide the device password to the network registrar 130 in a secure manner (the communication channel provide integrity and confidentiality).

At stage C, the network registrar 130 utilizes the device password to initiate enrollment process 126 to configure the new enrollee device 140. In some embodiments, the network registrar 130 may also be an access point or router of the communication network 120. In other embodiments, the network registrar 130 instructs another network node (such as a PLC/Router) to configure the new enrollee device 140. The enrollment process 126 in this example is initiated by the network registrar 130 in response to receiving the new enrollee device's device password from the electronic device 110. In one embodiment, the electronic device 110 is considered a trusted intermediary because it may already be associated with the communication network 120 and registered with the network registrar 130.

At stage D, the enrollment process 126 may be one of several known processes or protocols that are used to provide the network configuration information for a home network. For example, the network registrar 130 may generate a network membership key for the new enrollee device 140 and transmit the network membership key encrypted using the device password so that the new enrollee device 140 can decrypt and receive the network membership key securely. Having the network membership key, the new enrollee device 140 may be enabled for communication via the home network. Other examples of the enrollment process may include the use of a PLC DAK protocol and/or WSC PIN protocol with the new enrollee device 140.

At stage E, the network registrar 130 may provide a network feedback indicator 160 (e.g. acknowledgement or confirmation message) back to the electronic device 110. The network feedback indicator 160 may, for example, confirm that the device password was received properly. The network feedback indicator 160 may also indicate whether or not the enrollment process 126 was successfully completed. In another example, the network feedback indicator 160 is provided back to the electronic device 110 upon successfully completing the enrollment process 126 with the new enrollee device 140. In this example, the user of the electronic device 110 is made aware that the configuration was properly completed. In example embodiments, the feedback may also include an IP address or other network identifier associated with the configured new enrollee device 140, such that a management application on the electronic device 110 could provide further configuration and otherwise manage/control the operation of the new enrollee device 140. Alternatively, the IP address or other network identifier may be used to indicate to a user of the electronic device 110 that the new enrollee device 140 is activated on the communication network 120. For example, an indication may be presented via a user interface of the electronic device 110 to indicate whether the new enrollee device 140 was enrolled (added) to the communication network 120. It may be advantageous to receive this indicator if the new enrollee device 140 is a headless device because otherwise a user may be left to wonder or test through trial-and-error to determine whether the headless device has been properly added to the communication network 120.

FIG. 2 is an example block diagram 200 illustrating various example implementation options. Optional implementation-specific details are described, which may be used together, or separately, in various example embodiments.

At stage A is shown an implementation option where the device password is encoded in a tag 250 that is associated with the new enrollee device 140. The tag 250 in FIG. 2 may be, for example, a barcode printed on packaging, product form factor, printed insert, or affixed to new enrollee device 140. Optionally, the tag 250 may be removable to maintain security of the communication network 120 once the new enrollee device 140 has been added to the communication network 120.

Stage B shows another implementation option where the enrollment process 226 involves a network node 230 that is separate from the network registrar 130. For example, the network registrar 130 may have a logical connection 225 to network node 230 using one type of home networking technology (such as WLAN) and the network node 230 may utilize a different type of home networking technology (such as PLC) for the enrollment process 226.

As shown in FIG. 2, it should be clear that the network registrar 130 may utilize more than one type of home networking technology. For example, link 224 that communicatively couples the electronic device 110 to the network registrar 130 may use a first home networking technology (such as WLAN). Link 225 that communicatively couples the network registrar 130 to the network node 230 (or directly to the new enrollee device 140) may use a second home networking technology (such as MoCA).

Finally, stage C of FIG. 2 reiterates that the network registrar 130 may provide further device information to the electronic device 110 regarding the new enrollee device 140. As an example for illustrative purposes, the network registrar 130 may provide an IP address or management URL for the new enrollee device 140 back to the electronic device 110. The electronic device 110 may have management software that provides further services configuration or user interface for managing the new enrollee device 140 using the device information provided at stage C.

FIG. 3 is an example block diagram 300 illustrating another embodiment of configuring a new enrollee device. In FIG. 3, the electronic device 110 may have a more active role in the enrollment of new enrollee device 140. At stage A, rather than detecting a device password from the new enrollee device 140, the electronic device 110 may generate a device password for the new enrollee device 140. The generated device password may be a random or pseudorandom alphanumeric or bit string. The generated device password can be communicated to both the new enrollee device 140 and the network registrar 130 so that they can use the generated device password as a shared secret for mutual authentication and encryption of further network configuration information.

At stage B, the electronic device 110 may communicate the generated device password to the new enrollee device 140 using a variety of techniques. For example, the generated device password may be communicating using optical, audio, or radio frequency signals that are detectable by the new enrollee device 140. In one implementation example, the new enrollee device 140 is a device that has a photo sensor. It may be cost effective to utilize photo sensors rather than radio frequency sensors for low cost smart devices, such as smart light bulbs. The new enrollee device 140 may recover the generated device password based on decoding data-encoded variations in amplitude, frequency, or duration (or any combinations thereof) of optical, audio, or radio frequency signals.

At stage C, the electronic device 110 provides the generated device password to the network registrar 130, thereby invoking an enrollment process 126 on behalf of the new enrollee device 140. The remaining stages D and E function similarly to those described in FIG. 1.

Figure 4:
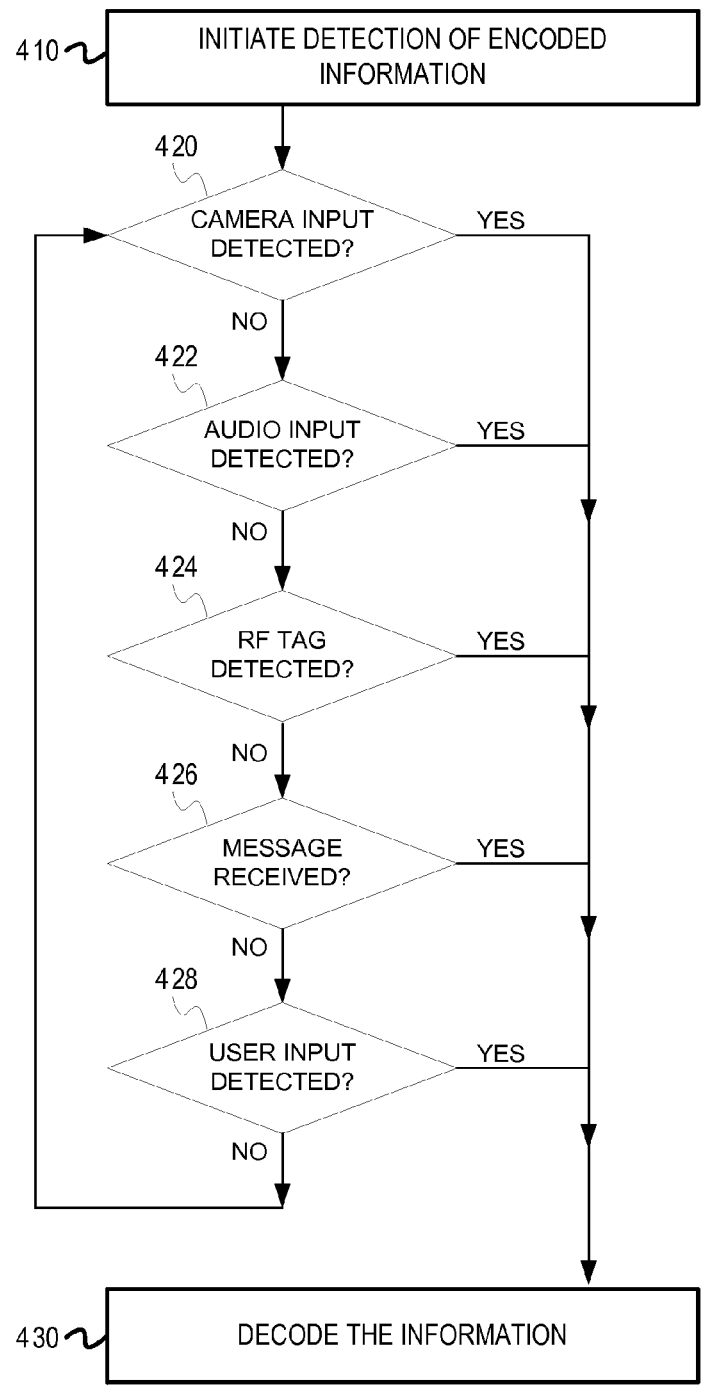
FIG. 4 is a flow diagram of example operations that may be performed by an electronic device to obtain a device password from a new enrollee device in accordance with this disclosure.

FIG. 4 is a flow diagram of example operations that may be performed by an electronic device to obtain a device password from a new enrollee device. Various items described in FIG. 4 are optional and may be included, excluded, or reordered in various embodiments. Furthermore, various items described in FIG. 4 may be performed concurrently in some implementations. At 410 the electronic device initiates detection of the encoded information. For example, a user of the electronic device may launch a utility application for adding the new enrollee device to the home network. At 420, the electronic device may determine if the camera detects the encoded information (such as an image of a barcode or other visual tag). If the camera detects the encoded information, the image is decoded at 430 to recover the device password from the image. If the electronic device does not detect the encoded information via the camera, then the electronic device may determine if audio information is detected by a microphone at 422. For example, the microphone of the electronic device may receive audio-encoded information from a smart speaker being added as the new enrollee device. If detected, the encoded information is decoded at 430. If the electronic device does not detect the encoded information via the audio input, then the electronic device may determine if radio frequency information is detected at 424. For example, the electronic device may detect a, an RFID or NFC signal, or other short range radio frequency transmission that may be used to receive the device password. If the electronic device does not detect the encoded information via a radio frequency signal, then the electronic device may determine if a message containing the device password has been received at 426. For example, the device password may be encoded in an electronic message, short messaging service (SMS) message, or other communication received at the electronic device, perhaps pursuant to a user registration of the new enrollee device at a manufacturer or third-party registration service. If the electronic device does not detect the device password in a message received, then the electronic device may prompt for user input of the device password at 428.

Figure 5:
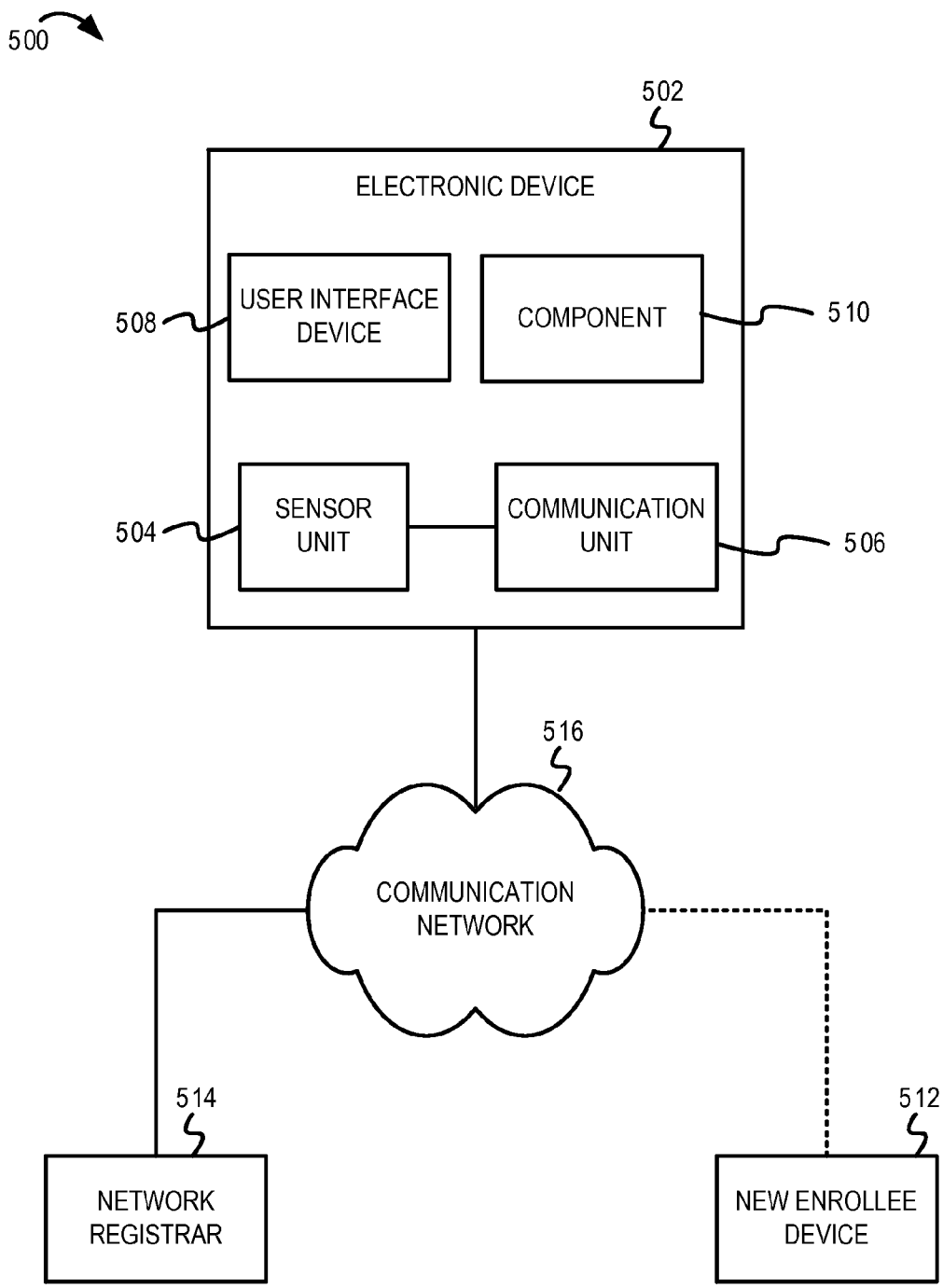
FIG. 5 is an example block diagram of one embodiment of an electronic device operable to implement various embodiments in this disclosure.

FIG. 5 depicts an example embodiment of a system 500 including an electronic device 502 (e.g., a smart phone or a tablet computer, etc.), a new enrollee device 512, and a network registrar 514 is depicted in FIG. 5. The electronic device 502, the new enrollee device 512, and the network registrar 514 are communicatively coupled via a communication network 516 (e.g., a WLAN, a PLC network, a hybrid network, etc.). The electronic device 502 comprises a sensor unit 504, a communication unit 506, and a user interface device 508. The sensor unit 504 in conjunction with the communication unit 506 can detect/decode the device password (e.g., PIN, PLC key, etc.) associated with the new enrollee device 512 to enroll the new enrollee device 512 with the network registrar 514, as described above with reference to FIGS. 1-4. For example, the sensor unit 504 may be a camera, NFC interface, photo sensor, barcode scanner, microphone, or other such components capable of detecting a device password associated with the new enrollee device, as described above with reference to FIGS. 1, 2, and 4. Other components, such as component 510, may also be part of electronic device 502. The user interface device 508 and/or other component 510 may be used by the electronic device to communicate a generated device password to the new enrollee device, as described above with reference to FIG. 3. For example, the electronic device 502 can use a component 510, such as actuators, camera flash, LED, speakers, NFC interface, etc. to communicate a generated device password to the new enrollee device 512.

Figure 6:
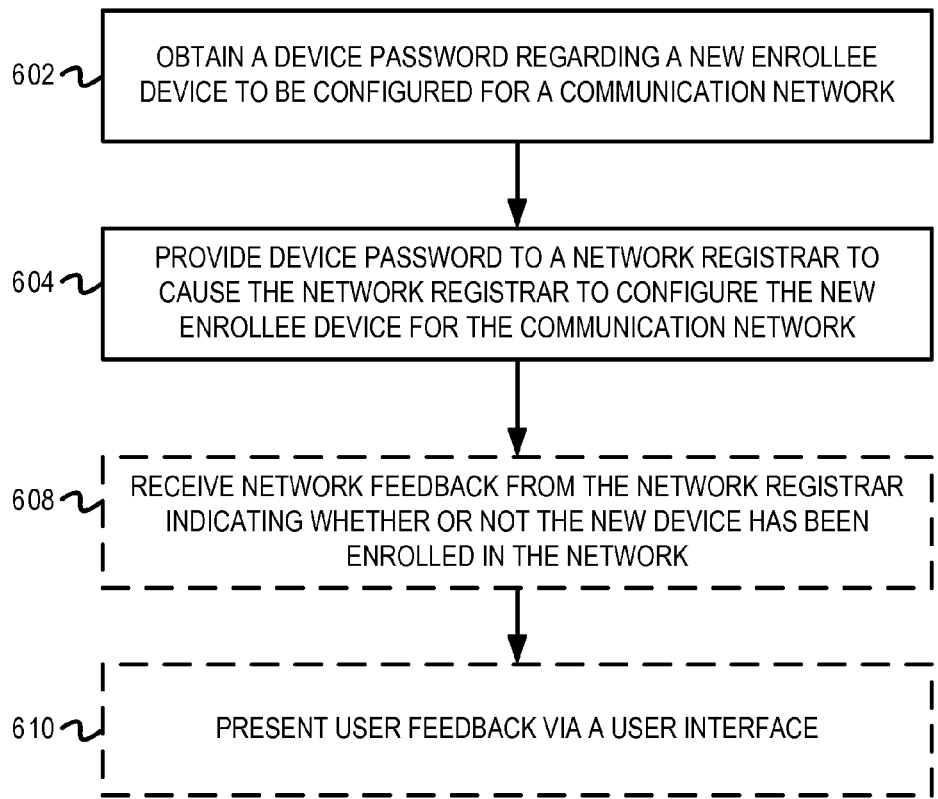
FIG. 6 is a flow diagram of an embodiment of configuring a new enrollee device for a communication network in which an electronic device obtains a device password from the new enrollee device in accordance with this disclosure.

FIG. 6 is a flow diagram 600 of an embodiment of configuring a new enrollee device for a communication network. At block 602, an electronic device obtains a device password regarding a new enrollee device to be configured for a communication network. The device password may be obtained from the new enrollee device or from a visual, audio, radio frequency, or other encoded information tag associated with the new enrollee device. At block 604, the electronic device provides the device password to a network registrar to cause the network registrar to configure the new enrollee device for the communication network. At 608, the electronic device may receive a network feedback indication from the network registrar indicating whether or not the new enrollee device has been successfully enrolled (configured) for use in the communication network. At 610, the electronic device may present user feedback via a user interface. The user feedback may inform the user whether or not the new enrollee device has been properly added to the communication network. The user feedback may be an audible tone or tones that are recognized as either positive or negative, to reflect successful or unsuccessful enrollment, respectively. Alternatively, the user feedback may be a visual indictor or detailed information, such as in a graphical user interface available on the electronic device.

Figure 7:
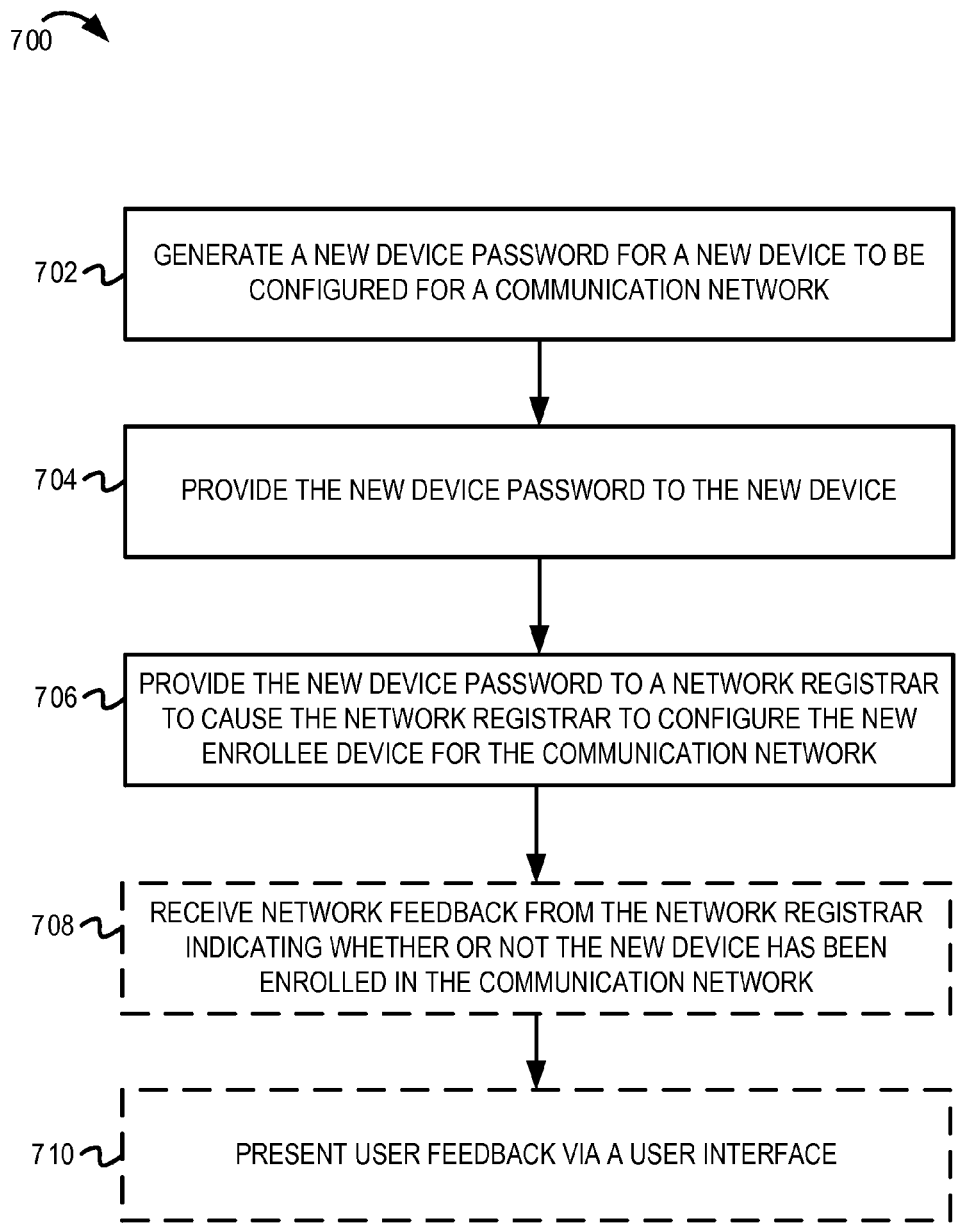
FIG. 7 is a flow diagram of an embodiment of configuring a new enrollee device for a communication network in which an electronic device generates and provides a device password in accordance with this disclosure.

FIG. 7 is a flow diagram 700 of an embodiment of configuring a new enrollee device for a communication network. At block 702, an electronic device generates a new device password for a new enrollee device to be configured for a communication network. At 704, the electronic device provides the new device password to the new enrollee device. At 706, the electronic device provides the new device password to a network registrar to cause the network registrar to configure the new enrollee device for the communication network. At 708, optionally, the electronic device receives a network feedback indication from the network registrar indicating whether or not the new enrollee device has been successfully enrolled (configured) for use in the communication network. At 710, optionally, the electronic device presents user feedback via a user interface. The user feedback informs the user whether or not the new enrollee device has been properly added to the communication network.

Figure 8:
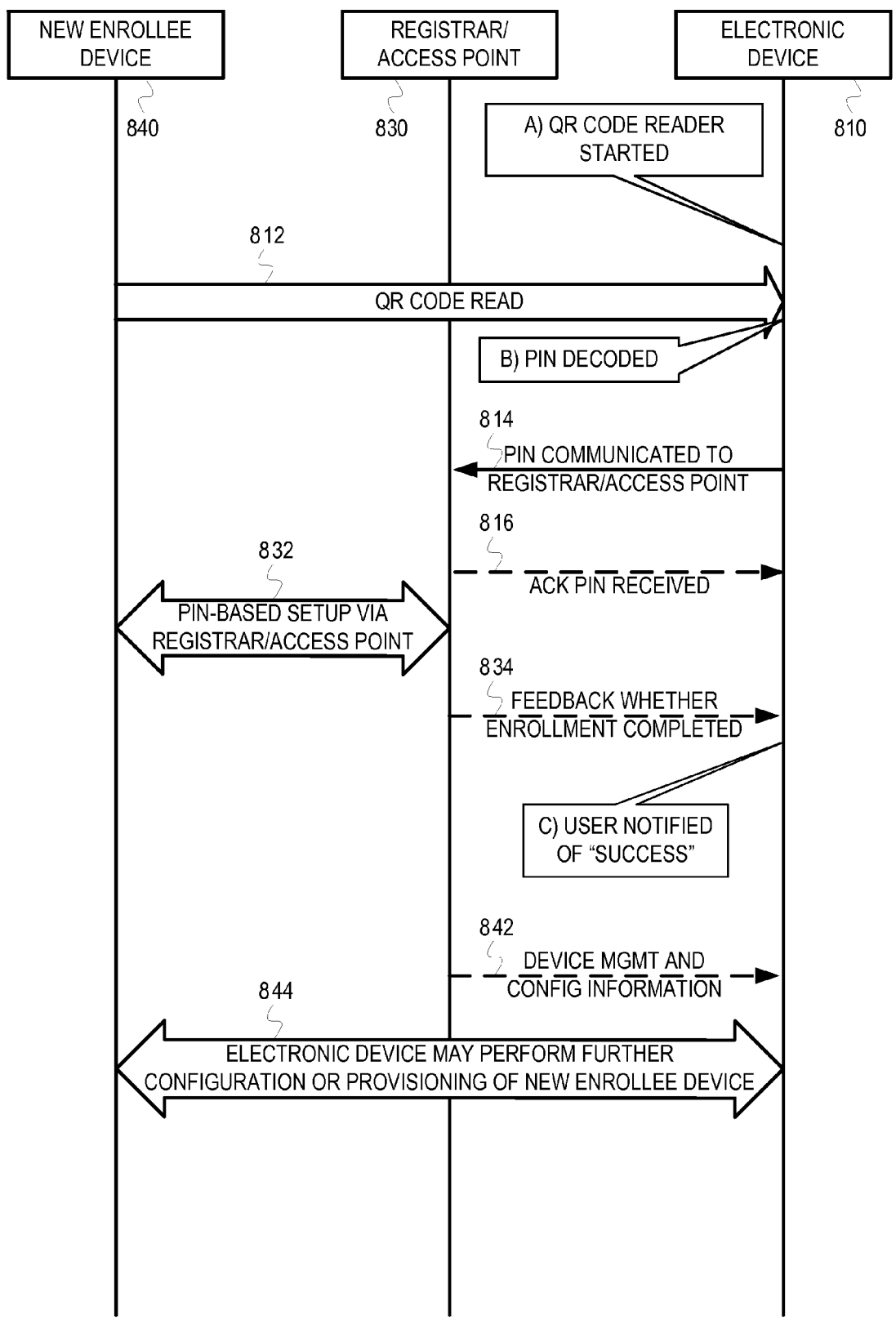
FIG. 8 is a message flow diagram showing operations performed by a new enrollee device, network registrar, and electronic device in accordance with an embodiment of this disclosure.

FIG. 8 is a message flow diagram showing operations performed by a new enrollee device 840, network registrar 830, and electronic device 810, according to some embodiments. At stage A, the electronic device 810 begins detecting for encoded information that may include a device password associated with the new enrollee device 840. For example, a QR Code reader application is launched. At 812, the electronic device 810 detects the encoded information, such as a QR Code image at the enrollee device 840 is detected by a camera of the electronic device 810. At stage B, the electronic device 810 decodes the QR Code image to obtain the device password (PIN) associated with the new enrollee device 840. At 814, the device password is communicated to the network registrar 830, which may or may not also function as an access point for the communication network. At 816, the network registrar 830 may acknowledge to the electronic device 810 that it received the device password. At 832, the network registrar 830 and the new enrollee device 840 perform an enrollment process based upon the device password. At 834, the network registrar 830 may provide network feedback to the electronic device 810 to indicate whether the enrollment process completed. At stage C, if the network feedback indicates that the enrollment process completed, the electronic device 810 provides a user notification indicating such. Otherwise, the electronic device 810 may indicate that the enrollment process failed and may prompt the user retry, detect for a new device password, or resend the device password to the network registrar 830.

At 842, the network registrar 830 may provide further device information to the electronic device 810, as described previously in relation to FIG. 1. In some implementations, after the enrollment process completes further configuration of the new enrollee device 840 may be needed—for example so-called application-level settings. As an example, a smart light bulb may need to be configured with a schedule, settings related to light intensity or power usage. At 844, the electronic device may perform further configuration or provisioning of new enrollee device.

It should be understood that FIGS. 1-8 are examples meant to aid in understanding embodiments and should not be used to limit embodiments or limit scope of the claims. Embodiments may comprise additional circuit components, different circuit components, and/or may perform additional operations, fewer operations, and operations in a different order, operations in parallel, and some operations differently. It should be understood that although examples refer to an electronic device being used to enroll a new enrollee device in the home network and to control the new enrollee device once enrolled, embodiments are not so limited. In other embodiments, another suitable electronic device (e.g., a tablet computer) that has user input capabilities and appropriate sensors (e.g., a camera, microphone, NFC detector, barcode scanner, etc.) to capture the device password can be employed.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 9:
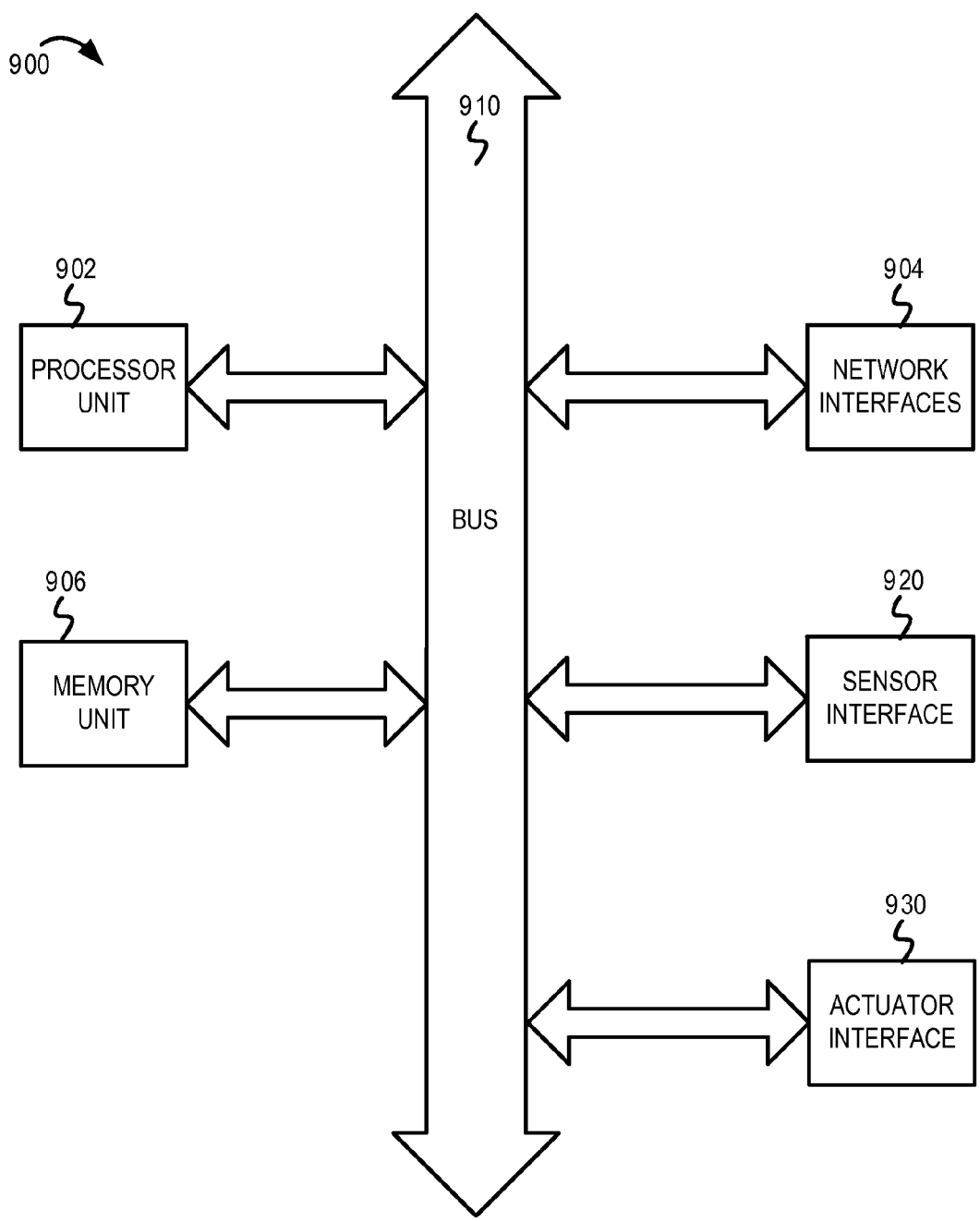
FIG. 9 is an example block diagram illustrating a new enrollee device capable of being configured for a communication network in accordance with an embodiment of this disclosure.

FIG. 9 is an example block diagram of one embodiment of a new enrollee device 900 capable of being configured for a communication network in accordance with an embodiment of this disclosure. In some implementations, the new enrollee device 900 may be an electronic device such as a laptop computer, a tablet computer, a mobile phone, a powerline communication device, a new enrollee device, a gaming console, or other electronic systems comprising functionality to communicate across multiple communication networks (which form the hybrid communication network). The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, Infini-Band®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 900 can comprise a plurality of network interfaces—each of which couples the electronic device 900 to a different communication network. For example, the electronic device 900 can comprise a powerline communication interface and a WLAN interface that couple the electronic device 900 with a power line communication network and a wireless local area network respectively.

The electronic device 900 also includes a sensor interface 920. The sensor interface 920 may be capable of detecting optical, audio, or radio frequency signals from an electronic device. For example, the sensor interface 920 may allow the electronic device 900 to receive a generated device password from the electronic device and utilize the generated device password to perform an enrollment process via the network interface 904.

The electronic device 900 also includes an actuator interface 930. The actuator interface 930 may be capable of emitting optical, audio, or radio frequency signals from an electronic device. For example, the actuator interface 930 may allow the electronic device 900 to send a static or dynamic device password to the electronic device and utilize this device password to perform an enrollment process via the network interface 904.

Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, techniques for configuring a new enrollee device for use in a hybrid communication networks as described herein may be implemented with facilities consistent with any hardware system or hardware systems. Many variations, modifications, additions, and improvements are possible. For example, although described as separate devices in the foregoing example embodiments, in some embodiments the electronic device and the network registrar may be parts of a common system or apparatus. Alternatively, the electronic device may be a separate apparatus from the network registrar as described in the foregoing example embodiments.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    generating, at an electronic device, a device key for a new enrollee device to be configured for a communication network, wherein the new enrollee device is a headless device that lacks a user interface for configuring the new enrollee device for the communication network;
    providing, by the electronic device, the device key to a network registrar to cause the network registrar to configure the new enrollee device for the communication network; and
    receiving an indication from the network registrar indicating whether the new enrollee device has been successfully configured for the communication network using the device key.

2. The method of claim 1, further comprising:
    presenting based, at least in part, on the indication, user feedback via a user interface device of the electronic device, wherein the user feedback indicates that the new enrollee device has not been successfully configured for the communication network; and
    prompting, via the user interface device, for a new device key associated with the new enrollee device.

3. The method of claim 1, further comprising, after said providing:
    receiving, from the network registrar, device information for controlling the new enrollee device, wherein the device information indicates that the new enrollee device has been successfully configured for the communication network.

4. The method of claim 3, wherein the device information comprises at least one member of a group consisting of a network address, a device name, a device model number, and a management address for managing the new enrollee device via the communication network.

5. The method of claim 3, further comprising:
    enabling, at the electronic device, a user interface device for controlling the new enrollee device using the device information.

6. The method of claim 1, wherein the electronic device comprises a mobile device communicatively connected to the communication network prior to said providing.

7. The method of claim 1, wherein the electronic device is at least one member of a group consisting of a mobile phone, notebook computer, and a tablet computer.

8. The method of claim 1, wherein the communication network is a hybrid communication network having more than one access technology.

9. The method of claim 1, wherein
    the electronic device is not communicatively coupled to the new enrollee device prior to the generating.

10. An electronic device, comprising:
    a first network interface configured for communications with a network registrar via a communication network;
    a processor; and
    a memory storing instructions which, when executed by the processor, cause the electronic device to,
        generate a device key for a new enrollee device to be configured for the communication network, wherein the new enrollee device is a headless device that lacks a user interface for configuring the new enrollee device for the communication network,
        provide the device key to the network registrar to cause the network registrar to configure the new enrollee device for the communication network, and
        receive an indication from the network registrar indicating whether the new enrollee device has been successfully configured for the communication network using the device key.

11. The electronic device of claim 10, further comprising:
    a user interface device, and
    wherein the instructions, when executed by the processor, further cause the electronic device to detect a presence of the new enrollee device via the user interface device.

12. The electronic device of claim 10, wherein the indication indicates that the new enrollee device has not been successfully configured for the communication network, and
wherein the instructions, when executed by the processor further cause the electronic device to,
obtain a new device key associated with the new enrollee device, and
provide the new device key to the network registrar.

13. The electronic device of claim 10, further comprising:
a user interface device to present user feedback indicative of whether the new enrollee device has been successfully configured for the communication network.

14. A non-transitory machine-readable storage media having stored therein a program product which, when executed by one or more processors, causes the one or more processors to perform operations that comprise:
generating, at an electronic device, a device key for a new enrollee device to be configured for a communication network, wherein the new enrollee device is a headless device that lacks a user interface for configuring the new enrollee device for the communication network;
providing, by the electronic device, the device key to a network registrar to cause the network registrar to configure the new enrollee device for the communication network; and
receiving an indication from the network registrar indicating whether the new enrollee device has been successfully configured for the communication network using the device key.

15. A method comprising:
detecting, at an electronic device, a presence of a new enrollee device to be configured for a communication network, wherein
the new enrollee device is a headless device that lacks a user interface for configuring the new enrollee device for the communication network;
generating a device key for the new enrollee device; and
providing the device key to the new enrollee device and to a network registrar to cause the network registrar to initiate an enrollment process for the new enrollee device using the device key, wherein
said providing the device key is performed by the electronic device in response to the electronic device detecting the presence of the new enrollee device.

16. The method of claim 15, wherein said providing the device key to the new enrollee device comprises communicating the device key to the new enrollee device via an output component of the electronic device.

17. The method of claim 16, wherein the output component comprises at least one member of a group consisting of an actuator, a near-field communication (NFC) interface, an LED, a speaker, a display screen, and a camera flash component.

18. The method of claim 15, wherein said detecting is performed via a user interface device of the electronic device.

19. The method of claim 15, further comprising:
receiving an indication from the network registrar indicating whether the new enrollee device has been successfully configured for the communication network, and
presenting user feedback based, at least in part, on the indication, wherein the user feedback indicates whether the new enrollee device has been successfully configured for the communication network.

20. The method of claim 19, wherein the user feedback is presented via a user interface device of the electronic device.

21. An electronic device, comprising:
a first network interface configured for communications with a network registrar via a communication network;
a processor; and
a memory storing instructions which, when executed by the processor, cause the electronic device to,
detect, at the electronic device, a presence of a new enrollee device to be configured for the communication network, wherein
the new enrollee device is a headless device that lacks a user interface for configuring the new enrollee device for the communication network,
generate a device key for the new enrollee device, and
provide the device key to the new enrollee device and to the network registrar to cause the network registrar to initiate an enrollment process for the new enrollee device using the device key, wherein
the device key is provided in response to the electronic device detecting the presence of the new enrollee device.

22. The electronic device of claim 21, further comprising:
an output component, and
wherein the instructions, when executed by the processor, cause the electronic device to provide the device key to the new enrollee device via the output component of the electronic device.

23. The electronic device of claim 21, further comprising:
a user interface device, and
wherein the instructions, when executed by the processor, cause the electronic device to detect the presence of the new enrollee device via the user interface device.

24. The electronic device of claim 21, wherein the instructions, when executed by the processor, further cause the electronic device to,
receive an indication from the network registrar indicating whether the new enrollee device has been successfully enrolled for the communication network, and
present based, at least in part, on the indication, user feedback indicating whether the new enrollee device has been successfully enrolled for the communication network.

25. The electronic device of claim 24, further comprising:
a user interface device, and
wherein the user feedback is presented via the user interface device.

26. A non-transitory machine-readable storage media having stored therein a program product, which when executed by one or more processors causes the one or more processors to perform operations that comprise:
detecting a presence of a new enrollee device to be configured for a communication network, wherein
the new enrollee device is a headless device that lacks a user interface for configuring the new enrollee device for the communication network,
generating a device key for the new enrollee device, and
providing the device key to the new enrollee device and to a network registrar to cause the network registrar to initiate an enrollment process for the new enrollee device based upon the device key, wherein
said providing the device key is performed responsive to the detecting the presence of the new enrollee device.

27. A method comprising:
receiving, at a network registrar, a device key from an electronic device, the device key generated by the electronic device for a new enrollee device to be configured for a communication network, wherein the new enrollee device is a headless device that lacks a user interface for configuring the new enrollee device for the communication network;

performing, using a processor of the network registrar, an enrollment process to configure the new enrollee device for the communication network in response to receiving the device key; and providing an indication to the electronic device indicating whether the new enrollee device has been successfully configured for the communication network using the device key.

28. The method of claim 27, further comprising providing device information to the electronic device for controlling the new enrollee device, wherein the device information indicates that the new enrollee device was successfully configured for the communication network.

29. The method of claim 27, wherein the network registrar is an access point or router of the communication network.

30. The method of claim 27, wherein said performing includes instructing another network node to configure the new enrollee device based upon the device key.

31. The method of claim 27, wherein the device key is received via a first interface of the network registrar, the first interface associated with a first network technology, and wherein the enrollment process includes sending a provisioning message via a second interface of the network registrar, the second interface associated with a second network technology different from the first network technology.

* * * * *